July 21, 1959     S. BERGSTROM     2,895,351
SAW VISE
Filed March 22, 1957
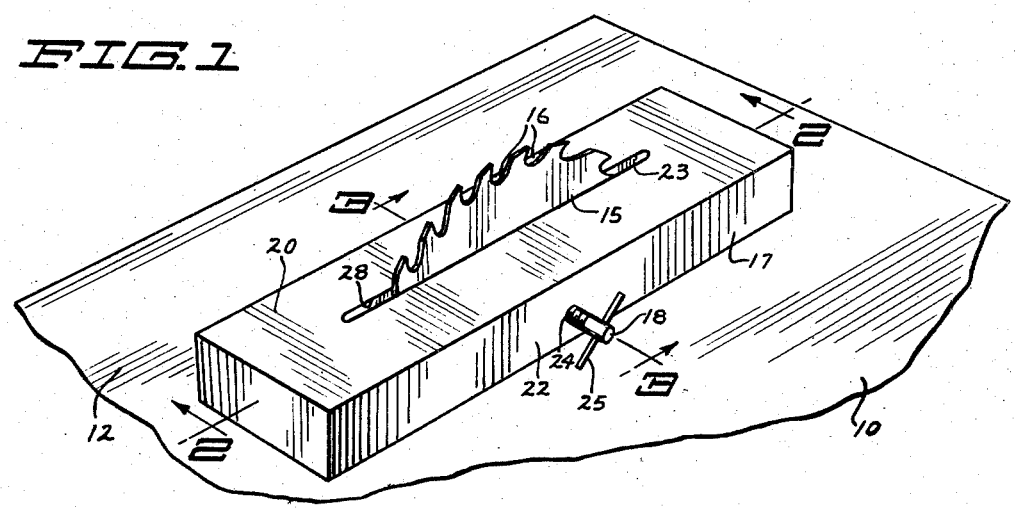
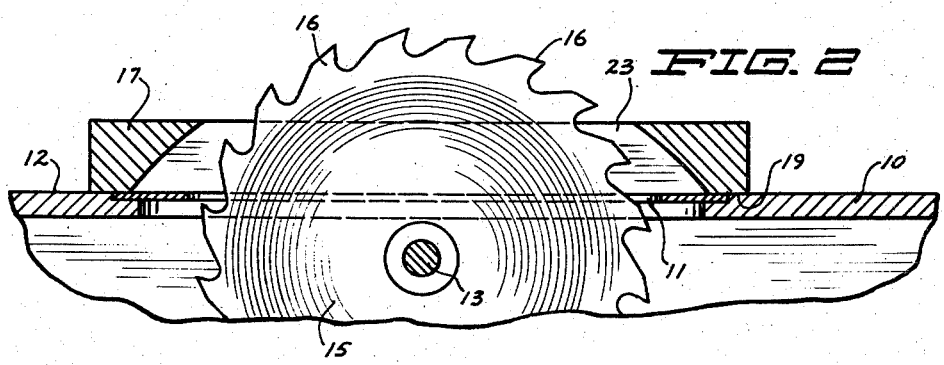
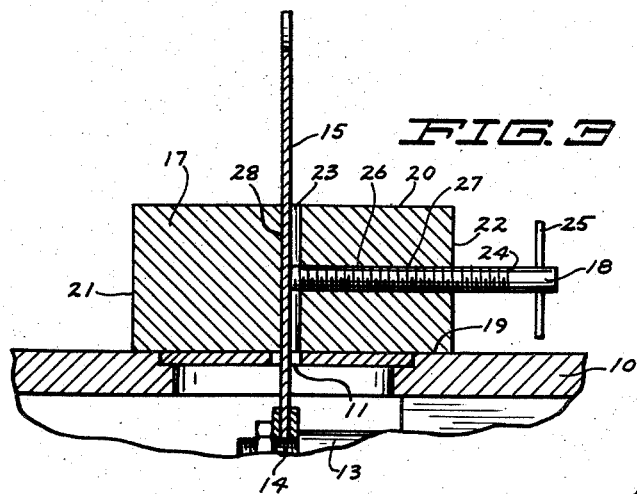
INVENTOR.
STANLEY BERGSTROM
BY
Braddock and Braddock
ATTORNEYS

United States Patent Office 2,895,351
Patented July 21, 1959

2,895,351

SAW VISE

Stanley Bergstrom, Minneapolis, Minn.

Application March 22, 1957, Serial No. 647,840

2 Claims. (Cl. 76—78)

The invention herein has relation to a new and improved saw vise designed to be especially useful for the purpose of rigidly retaining circular saws in stationary position while the teeth thereof are being sharpened, bent, or otherwise operated upon.

In the accompanying drawing forming a part of this specification,

Fig. 1 is a perspective view of a saw vise made according to the invention as when applied to use;

Fig. 2 is an enlarged vertical, longitudinal sectional view, taken on line 2—2 in Fig. 1; and Fig. 3 is an enlarged vertical, transverse sectional view, taken on line 3—3 in Fig. 1.

Referring to the drawings and the numerals of reference thereon, 10 denotes a table or shelf of a saw bench which can be of any ordinary or preferred construction, and 11 indicates a longitudinally extending, vertically disposed slot in said table or shelf. The top surface 12 of the table or shelf is flat.

A horizontal shaft 13, rotatably mounted on the saw bench at a location beneath the table or shelf 10, fixedly supports, as at 14, the central portion of a vertically disposed circular saw 15 which extends upwardly through the longitudinal slot 11 in clearing relation thereto to position well above the flat top surface 12 of said table or shelf. The horizontal shaft 13 is in a plane parallel to the flat top surface of the table or shelf. Peripheral teeth of the circular saw are designated 16.

A rectilinear block of the novel and improved saw vise is represented 17, and a clamp screw of said saw vise is denoted 18.

The rectilinear block 17 is of oblong configuration as disclosed. It includes a flat lower surface 19 to be rested upon the flat top surface 12 of the table or shelf 10. Desirably, the upper surface 20 of said rectilinear block also will be flat and parallel with the lower flat surface 19. As shown, the opposite side surfaces, denoted 21 and 22, respectively, of the rectilinear block 17 are flat and in parallel relation to each other.

A longitudinally extending, vertically disposed slot 23 through the rectilinear block 17 is for passage of a portion of the circular saw when the flat lower surface 19 of said rectilinear block is to be rested upon the flat top surface 12 of the table or shelf, and the construction and arrangement will be such that when the rectilinear block is upon the table or shelf, a peripheral portion of the circular saw will project upwardly above the upper surface 20 of said rectilinear block, about as disclosed in the drawing.

The clamp screw 18 is an elongated member externally threaded, as at 24, for the major portion of its length. A transverse hand piece 25 fixed in an end portion of the clamp screw is for ready accomplishment of its rotation.

A cylindrical opening 26 in the rectilinear block 17, contiguous at its inner end with the longitudinal slot 23 and at its outer end with the side surface 22 of said rectilinear block, is bounded or defined by an internal thread 27 for rotatably receiving the external thread 24 of the clamp screw 18. As disclosed, the cylindrical opening 26 is midway between the lower and upper surfaces of the rectilinear block, communicates with the longitudinal slot 23 at the midlength thereof and is in a plane parallel with the flat lower surface 19 of said rectilinear block, as well as in perpendicular relation to a circular saw when situated in said longitudinal slot 23 with the rectilinear block rested upon a flat top surface, such as 12, of a table or shelf of a saw bench.

The longitudinal slot 23 in the rectilinear block 17 is bounded or defined at the side thereof opposite the cylindrical opening 26 by a flat gripping surface 28 in perpendicular relation to said cylindrical opening.

In practical use of the saw vise, the rectilinear block 17 will be manually manipulated to cause a peripheral portion of the circular saw to enter the longitudinal slot 23 and said rectilinear block to be rested upon the flat top surface 12 of the table or shelf 10 of the work bench with the cylindrical opening 26 and the clamp screw 18 therein desirably in the vertical plane of the horizontal shaft 13 and the flat gripping surface 28 bounding or defining the side of said longitudinal slot 23 opposite said cylindrical opening and clamp screw in engaged relation to the adjacent surface of the circular saw. Evidently, the clamp screw 18 and the horizontal shaft 13 will be in parallel planes when the rectilinear block of the saw vise is rested upon the work bench table or shelf.

The inner end portion of the clamp screw 18 will be withdrawn from the elongated slot 23 while the saw vise is being assembled with the circular saw and situated in appropriate position on the table or shelf of the work bench. The circular saw can be secured in fixed relation to the rectilinear block of the saw vise when in its intended and proper position on said table or shelf merely by inward turning movement of the clamp screw to cause the inner end thereof to be forcibly engaged against the adjacent surface of said circular saw thus to cause it to be grasped between the flat gripping surface 28 and said inner end of said clamp screw, as in Fig. 3 of the drawing. Outward turning movement of the clamp screw will cause the circular saw to be released from the rectilinear block of the saw vise. Securing of the circular saw in fixed relation to the rectilinear block of the saw vise, in the manner as described, also will secure said rectilinear block down upon and in fixed relation to the table or shelf of the work bench whether or not said clamp screw and horizontal shaft are vertically alined. Stated differently, the clamp screw 18 and the flat gripping surface 28 of the rectilinear block 17 are, together, operative to secure the circular saw 15 in fixed relation to said rectilinear block, and said clamp screw, flat gripping surface and circular saw are, together, operative to fixedly secure the flat lower surface 19 of the rectilinear block down against the flat top surface 12 of the table or shelf 10 of the work bench.

What is claimed is:

1. A saw vise for retaining a circular saw in stationary position, said circular saw being rotatably mounted in a saw bench beneath a longitudinally slotted shelf thereof including a horizontal flat upper surface and a peripheral portion of the circular saw extending vertically upwardly through the slot in said shelf to a position above its flat upper surface, comprising a block of material including an upper surface and a lower flat surface to be rested upon and slidable over the flat upper surface of said shelf, the block having a vertical, longitudinally extending slot therethrough situated between and in spaced relation to each of opposite side walls thereof for reception of said peripheral portion of the circular saw to project upwardly above the upper surface of said block, a vertical, longitudinally extending gripping surface bounding a side of said slot in the block, a portion of the block at the side of the circular saw opposite said gripping surface having an internally threaded opening therethrough contiguous at an inner end thereof with the slot in said block and at an outer end thereof with a side surface of the block, a clamping screw in said internally threaded opening to be engageable with a side surface of said circular saw opposite the gripping surface, and manually operable means rigid with said clamping screw for accomplishing rotation thereof thus to cause an inner end of the clamping screw to be forcibly engaged against the surface of said circular saw adjacent to said clamping screw and the gripping surface to be forcibly engaged against the surface of the circular saw opposite the clamping screw, the clamping screw and gripping surface being operable to rigidly secure said circular saw to said block, and said circular saw, clamping screw and gripping surface being cooperatively operable to rigidly secure the block down against the upper surface of said shelf.

2. The combination as specified in claim 1 wherein said clamping screw is in perpendicular relation to said gripping surface.

References Cited in the file of this patent

UNITED STATES PATENTS

| | | |
|---|---|---|
| 542,282 | Rood | July 9, 1895 |
| 2,152,931 | Svensson et al. | Apr. 4, 1939 |
| 2,460,189 | Perry | Jan. 25, 1949 |
| 2,522,799 | Pitcher | Sept. 19, 1950 |
| 2,770,985 | Pearce | Nov. 20, 1956 |